May 22, 1962  W. M. McCONNELL  3,035,336
PLUG SCREW-ON APPARATUS FOR PIPE TESTERS
Filed June 29, 1960  4 Sheets-Sheet 1

INVENTOR.
William Mynard McConnell
BY Webb, Mackey &
Burden
HIS ATTORNEYS

May 22, 1962 W. M. McCONNELL 3,035,336
PLUG SCREW-ON APPARATUS FOR PIPE TESTERS
Filed June 29, 1960 4 Sheets-Sheet 2
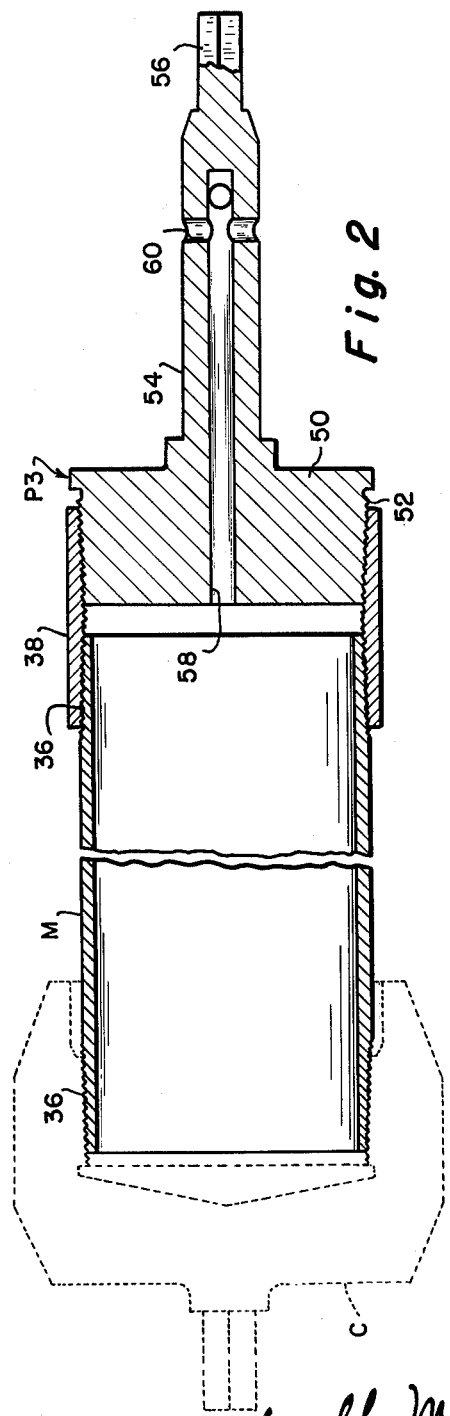
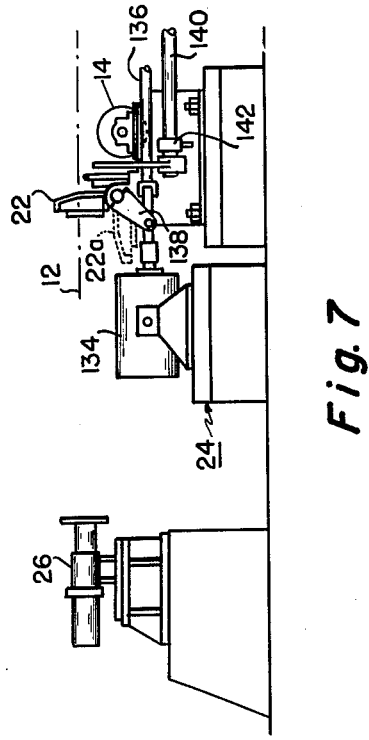
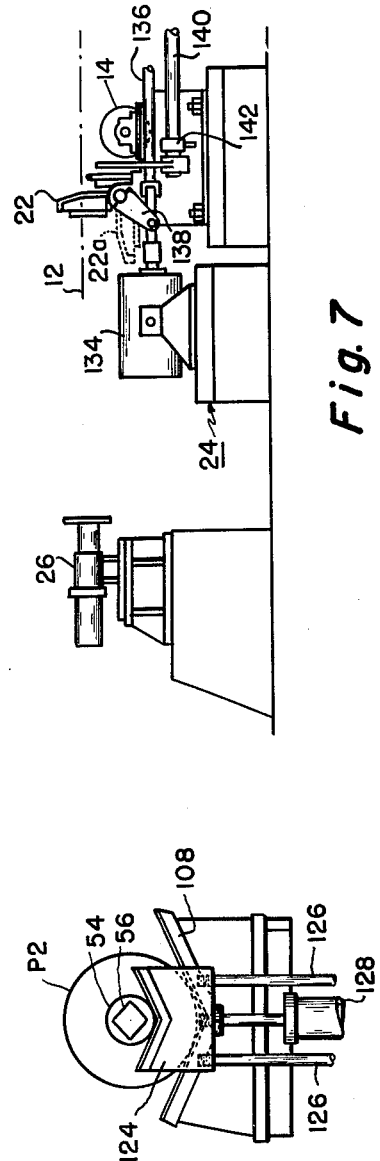
INVENTOR.
William Mynard McConnell
HIS ATTORNEYS

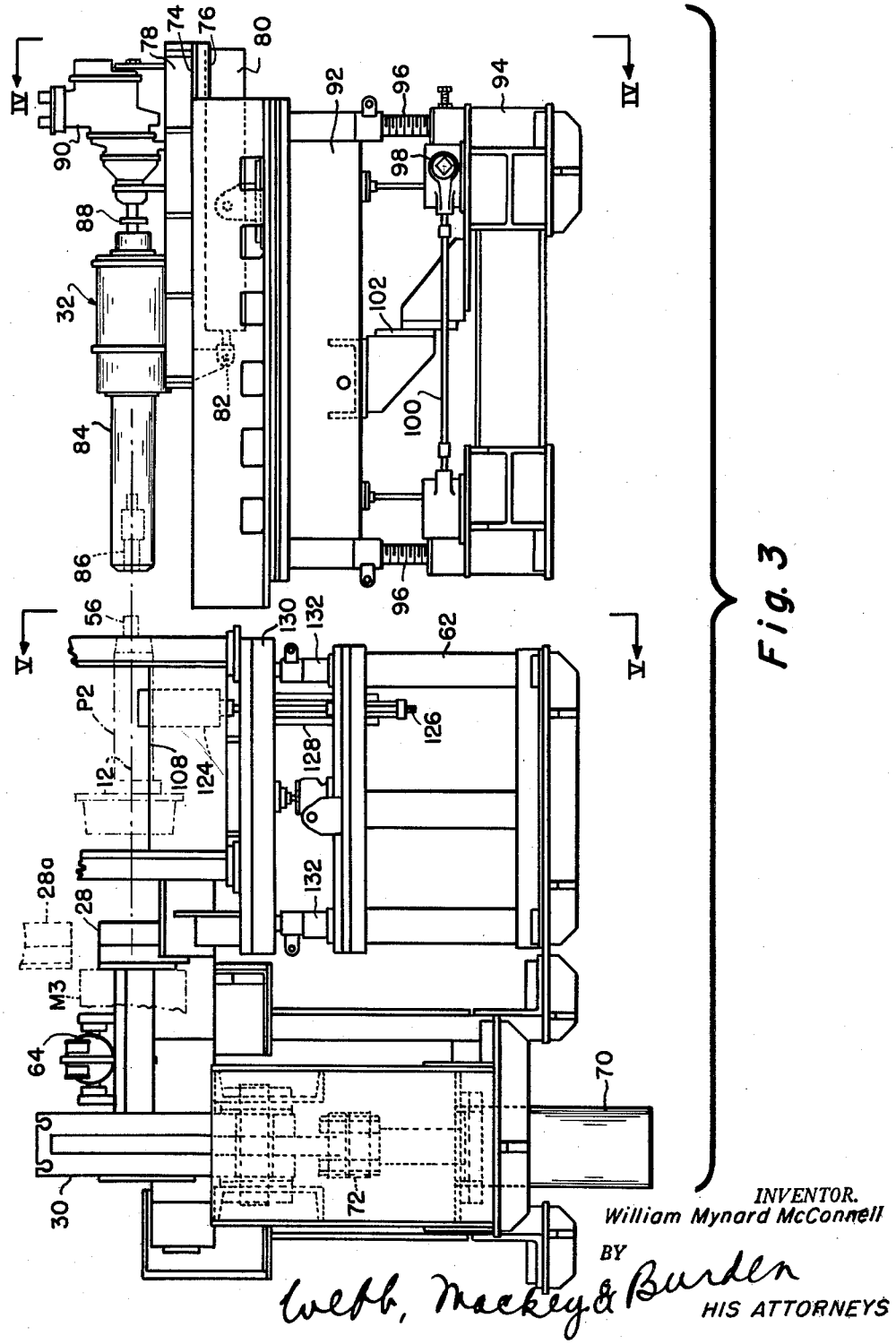

United States Patent Office 3,035,336
Patented May 22, 1962

3,035,336
PLUG SCREW-ON APPARATUS FOR
PIPE TESTERS
William Mynard McConnell, Pittsburgh, Pa., assignor to Taylor-Wilson Manufacturing Company, Pittsburgh, Pa., a corporation of Pennsylvania
Filed June 29, 1960, Ser. No. 39,588
11 Claims. (Cl. 29—240)

The present application relates to plug screw-on apparatus for plugging threaded pipes in preparation for pressure testing the pipes. It is primarily adapted for use as an automatic screw-on station in hydrostatic pipe test equipment and, preferably, the field test equipment of that type as now employed, i.e., the tester used in a pipe mill which simulates actual field connections and pressures for test conditions.

A field test consists of applying a hollow plug member so as to close one end of a length of pre-threaded pipe following manufacture, charging the pipe with water by filling through the open end, capping that end with a threaded cap member so as to close it and keep out air, and introducing predetermined high pressure water through the hollow interior of the plug member so as to internally hydraulically stress the pipe for detecting defects through leakage. After the success or failure of the pipe is established, the closure members at the opposite ends are detached, whereupon the water empties from the pipe which is then removed. Automatic operation has not proved too feasible because of several existing drawbacks. One drawback attendant with the screw-on or plugging station is the irregular shape of the threaded plug member which is applied, making it a difficult operation to accomplish if not aligned and applied literally by eye to the threaded pipe.

Apparatus which comprises my invention overcomes the foregoing drawback as will now be explained, resulting in equipping each passing length of pipe with an individual one of the plugs automatically and keeping the plugs in constant reuse as they become available from tested pipe, each for recirculation in a fresh length of the pipe. Various features, objects, and advantages will either be specifically pointed out or become apparent when for a better understanding of the invention, reference is made to the following explanatory description taken in conjunction with the accompanying drawings which show a preferred embodiment hereof.

In the drawings:

FIGURE 2 is a longitudinal sectional view of a pipe member;

FIGURE 3 is a side elevational view of the portion of the apparatus indicated by the lines III—III in FIGURE 1.

FIGURE 6 is a fragmentary view corresponding to FIGURE 5 but showing the saddle fixture parts in a different position; and FIGURE 7 is a side elevation of a portion of the apparatus of FIGURE 1 viewed along the lines VII—VII and constituting the pre-alignment stop and attendant kickout structure.

Figure 1:
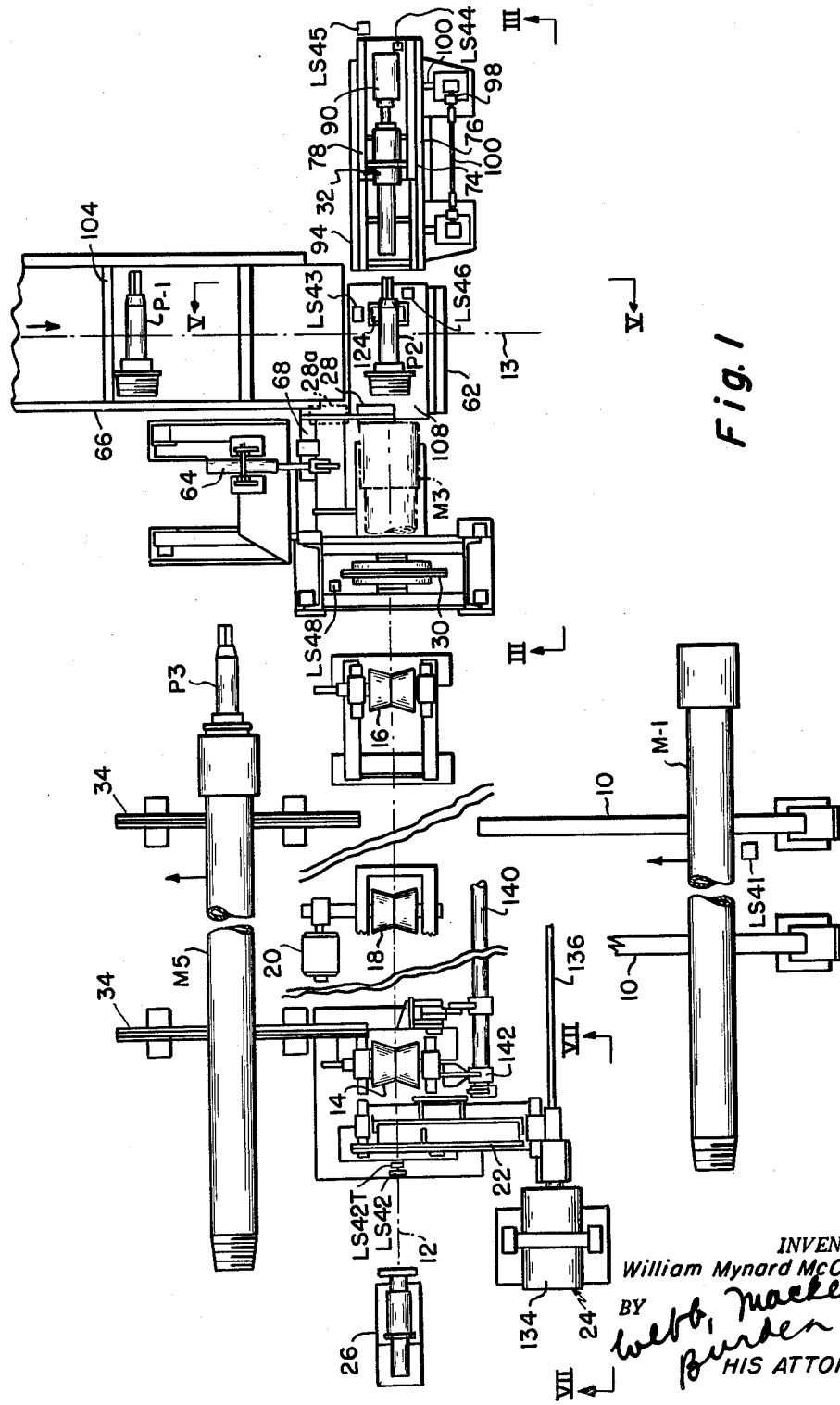
FIGURE 1 is a plan view of automatic screw-on apparatus for plugging pipe members according to the present invention.

The illustrated apparatus of FIGURE 1 is primarily intended, as already indicated, as an automatic screw-on station in a pipe field tester wherein pipe members with their axes mutually parallel are individually transferred sidewise among successive stations of the tester which are aligned in a row. In approaching the present station, each pipe member is fed on a set of aligned feed skids 10 to a point where, at the position M1, it will freely roll sidewise by gravity and drop onto a pipe roll line of which the axis 12 is at right angles to the axis 13 of a belt conveyor. In so doing, the pipe member takes a position M2 (not shown) concentric with the axis 12 but still squarely transversely aligned with its previous position M1. In practice, the feed skids 10 will be provided with a set of adjustable stop arms, not shown, to stop the rolling pipe and also a cooperating, power-operated kick-in mechanism affording the better control necessary, particularly for pipe members of the longer sizes.

The successive stations within the tester as a whole form a row of rather extensive length; widthwise, the apparatus at each such station may be many feet long accommodative of 40-foot pipe members or longer ones and with diameters up to about 13 inches. At each end, the pipe roll line of FIGURE 1 has a freely turning centrally notched roll, one being indicated at 14 and the other being an idler roll indicated at 16, for supporting the pipe members. Intermediate the end rolls 14 and 16, there is a number of further rolls 18 which are on stands approximately 8 feet apart and which, besides providing the preceding pipe supporting function, also provide reversible electric drive motors 20 which through appropriate gearing feed the pipe members endwise on the pipe roll line by applying drive torque to turn the rolls 18. Each of the rolls 18 is provided with a flipper plate (not shown) and the end roll 14 is provided with an identical flipper plate, the latter being indicated at 22 which together with the other plates, forms a common kickout mechanism 24. A prealignment stop 26, which is concentric to the roll line axis 12, is located adjacent the kickout mechanism 24.

The effect of the pipe roll line of FIGURE 1 is to reciprocate each pipe member, first in the axial direction away from the stop 26 into the position shown by the dotted lines M3 where it is stopped by a pipe stop 28 in its path and where it is clamped by a pipe gripper 30. After a pipe plug has reached a position P2 along the belt conveyor axis 13, it is axially advanced by an air-operated wrench 32 and then tightly threaded establishing screwed-together relationship with the pipe member. Thereafter, the conveyor roll line is reversed so that the plugged pipe member moves in the opposite direction to a position M4 (not shown) engaging the prealignment stop 26. The kickout mechanism 24 then operates the flipper plates 22 in unison whereupon the pipe member, occupying the position M5 with the plug in the screwed-together relationship therewith indicated at P3, rolls sidewise by gravity along a set of run-off skids 34 to a cap and prefill station (not shown) in the tester. Preferably, a pipe member in or about the position M5 is in the process of being kicked out and run off at the same time that fresh pipe member is in or about the incoming position M1 of FIGURE 1.

In FIGURE 2, the pipe member indicated by the general reference numeral M consists of a finished length of pipe having external pipe threads 36 at opposite ends and carrying a separate pipe coupling 38 secured at one of those ends. The presence of a captive coupling 38 thus carried by the pipe member saves installation time in the field and, in the case of some pipe, the coupling is manufactured integral therewith; whereas, as illustrated, it is formed as a separate piece and threaded thereon in the pipe mill at a coupling attaching station (not shown) in the tester.

The plug, although shown in its screwed-together position P3 in FIGURE 2, can readily be visualized as constituting a head-heavy affair when separate due to its enlarged head end 50 which is threaded with outside pipe threads 52 of a strengthened form and which complicates the overall plug shape because of the unbalance and substantially differing diameters presented at opposite ends of the plug. The smaller end consists of an elongated shank 54 of round cross-section which, at the extremity, is machined with a square cross-section 56 to receive a tool. A longitudinally extending passage 58 in the plug provides it with a centrally hollow interior which communicates with transverse induction passages 60 located in the elongated shank 54.

When the plug threads 52 seat in the coupling 38 of FIGURE 2, the enlarged head 50 of the plug forms a water-tight closure means at the end of the pipe member and when received in a high pressure adapter head, which registers with the induction passages 60, enables the interior of the pipe member M to have test pressure introduced from that end. The opposite end of the member M is preferably the one used by which the member M is prefilled with water and it is thereafter covered with a water-tight closure means consisting of a screw-on cap C indicated in dotted lines in FIGURE 2.

In FIGURES 1 and 3, prior to actual plugging, the pipe member is accurately positioned and held at M3 by the stop 28 and the gripper 30 at a point in mutually confronting adjacency to the point at which the plug saddle fixture stand 62 is adapted to hold the plug. A hydraulic cylinder 64 on a stand adjacent a belt conveyor 66 is connected to rotate a shaft 68 to which the stop 28 is affixed and which pivots that stop 28 across the axis 12 into the path of the pipe member as it approaches the position M3. Thereafter, the gripper 30 clamps the pipe owing to operation of a vertically disposed hydraulic cylinder 70 (FIGURE 3) having a piston rod which is pivotally connected at 72 to open and close the jaws of the gripper in conventional fashion. Shortly, the cylinder 64 is actuated to return the pipe stop 28 to its unpivoted position shown in dotted lines 28a.

Figure 4:
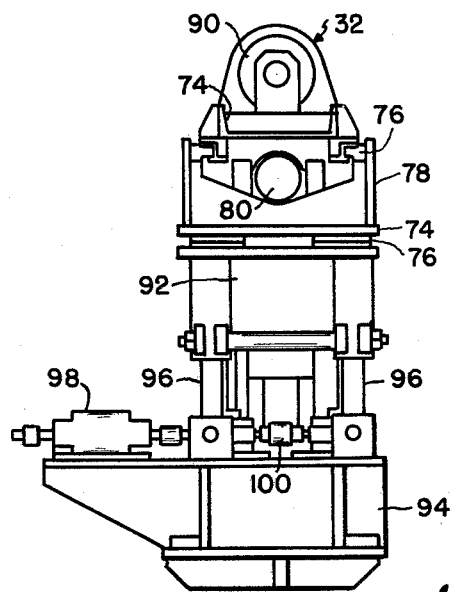
FIGURE 4 is an end elevation of that portion of the apparatus viewed in the direction of the lines IV—IV of FIGURE 3 and constituting the air-operated wrench for the plugs.

In FIGURES 1, 3 and 4, plugging of the pipe member is accomplished by the air-operated wrench 32 and attendant mechanism as follows. A slide 74 riding on fixed guides 76 supports a reciprocating wrench carriage 78. A fixed hydraulic cylinder 80 has the piston rod thereof pivoted at 82 to a depending lug on the carriage 78 for advancingly and retractively moving the wrench carriage enabling a plug to be relatively advanced with respect to a pipe member. A tool adapter 84 has a complemental socket 86 at one end for engaging the tool-receiving square section 56 at the small end of each plug. The adapter is supported on the carriage 78 for rotation on a fixed axis and is turned through a coupling 88 driven by a pneumatic rotary motor 90.

The fixed guides 76 for the carriage slide 74 are carried by the vertically adjustable platform 92 on a fixed stand 94. The adjustment is accomplished through a set of jack screws 96 disposed one at each corner of the stand 94 and having a common drive 98 which through cross-connections 100 coordinates the jack screws to keep the platform 92 level in all vertical positions.

Guide portions carried by the platform 92 and the stand 94 respectively engage one another to establish a vertical guideway 102 (FIGURE 3) insuring vertical alignment at all times between the platform 92 and the stand 94.

Figure 5:
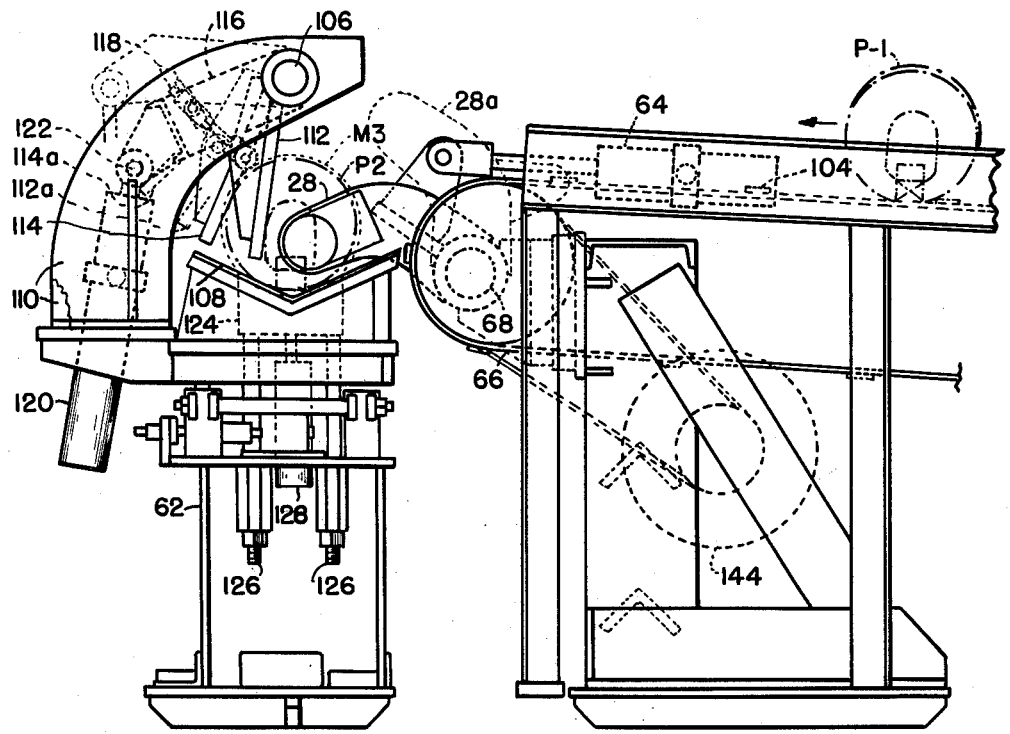
FIGURE 5 is an end elevation of the portions of FIGURES 1 and 3 which is indicated by the lines V—V of each of those figures, which constitutes the plug saddle fixture stand and attendant belt conveyor structure, and which shows certain parts of the fixture previously omitted from FIGURES 1 and 3 for clarity.

In FIGURES 1, 5 and 6, preparatory to plugging, the plug member is accurately prepositioned at a point P2 adjacent the assigned point M3 for the pipe member as follows. The belt conveyor 66 having transverse cleats 104 moves the pipe plugs along the axis 13 (FIGURE 1) as soon as they become available from tested pipe; the opposite end of the conveyor 66 is not shown but it will be understood to extend to the plug screw-off station of the tester (not shown). Details of the screw-off station and other major stations of the field tester are set forth in my copending U.S. application Serial No. 39,705, filed June 29, 1960. The cleats 104 force the plugs to advance from the position P1 (FIGURE 5) and to enter onto the plug saddle fixture stand 62, the direction of motion being indicated by an arrow in FIGURE 5.

A positioning fixture shaft 106, which is supported above the actual saddle structure 108 by a pair of upright posts 110 affixed to the stand 62, carries two depending ease-down arms 112 and 114 which can be pivoted from the dotted line position 112a and 114a, respectively shown, into their solid line position of FIGURE 5. In the solid line position, these arms 112 and 114 block the oncoming plug member by engaging the surface respectively at its smaller end 54 and at the enlarged head end 50. A common arm 116 (FIGURE 5) which is connected by separate adjustment screws 118 to the arms 112 and 114 for fixing their relative angularity, pivots them between their aforesaid positions about the shaft 106.

An air-operated cylinder 120, which is supported by the stand 62, has a pivotal connection at 122 to the outer end of the common arm 116 and is thus effective to return the arms 112 and 114 to their unpivoted positions shown by the dotted lines 112a and 114a. Unblocking an oncoming pipe plug in this manner enables it to settle in orderly fashion in the apical bottom of the main saddle structure 108 of FIGURE 5. Both when blocked and unblocked, the ends of the plug stay aligned with one another in the sense that a vertical reference plane therethrough is at all times substantially parallel to the conveyor axis 12.

The saddle structure 108 of FIGURES 1, 5 and 6 includes an auxiliary saddle 124 which rides on guide bolts 126 so as to move upwardly from its normal position flush with the surface of the saddle structure 108 according to FIGURE 6. An air-operated cylinder 128 is secured to the center of he auxiliary saddle 124 for raising and lowering it. When raised, the auxiliary saddle 124 is engageable with the smaller end of the plug for supporting it in a relatively elevated position with respect to the saddle structure 108 so as to maintain it coaxially level with the enlarged end of the plug member. The ends of the plug are thus aligned in a further sense whereby they and the intervening section of the plug occupy a common horizontal reference plane so as to be level with and concentric to the axis 12 of FIGURES 1 and 3.

Different sizes of plugs and pipes necessitate slight vertical adjustments of the saddle structure 108 and for this reason a platform 130 which supports same is connected to the stand 62 by means of jackscrews 132 at the four corners. Proper adjustment of these jackscrews and also the jackscrews 96 on the stand 94 ensures that when the air-operated wrench 32 advances and simultaneously rotates it will properly register for engaging a plug in the position P2 of FIGURE 3, causing simultaneous advancement and rotation hereof for being threaded into the adjacent pipe in its position M3. It will be understood that at this time the stop 28 of FIGURE 3 has been removed to its unpivoted position indicated by the dotted lines 28a.

In FIGURE 1, as augmented by FIGURES 3 and 7, the pipe member, after being plugged in its position indicated by the dotted lines M3, is unclamped by the pipe gripper 30 and retracted due to reversal of the pipe roll line to a prealigned point of engagement with the stop 26. A pivotally mounted hydraulic cylinder 134 included in the kickout mechanism 24 operates with a retracting motion pulling a pull rod 136 which is the common actuator to a plurality of crank arms 138 connected to individual flipper plates 22. These crank arms pivot the respective pivot plates from the position according to the dotted lines 22a into the solid line position shown. By acting in concert, the plates 22 raise a plugged pipe member, with its ends maintained level, from the pipe roll line to an elevated position where the pipe member is supported on sloping upper surfaces presented by the plates 22. The pipe member thereupon rolls sidewise by gravity to a position M5 to which it is transferred to the runoff skids 34 and from which it advances in the direction of the arrow of FIGURE 1 to the next station (not shown) in the tester. If desired, the pipe rolls 18 can be coordinated in their rotation by means of a common length of torque transmitting drive shafting 140 in which case the terminal portion of said shafting can be connected through a suitable box of right angle gearing 142 to drive the pipe roll 14 located adjacent the prealignment stop 26.

Each step in the use of the present screw-on apparatus can, if desired, be separately actuated or manually performed. It is preferred, however, to join the operation of all of the steps by properly placed limit switches and by conventional control circuits and timing circuits positioned about the apparatus and actuated as follows, it being understood that the pipe stop and the ease-down arms initially occupy their respective solid line positions 28, 112 and 114 appearing in FIGURE 5:

(1) A pipe member having its coupling on the right end as viewed in FIGURE 1 is placed in a position on the feed skids 10 for the screw-on apparatus. At the start, the kick-out mechanism 24 and the pipe roll line are operated by a push button switch having another switch LS41 (FIGURE 1) in parallel therewith and located on or adjacent the feed skids 10. These two parallel connected switches cooperate in the same circuit so that after the first pipe member is handled by the apparatus, its operation is thereafter automatically actuated as later described. This circuit:

(a) Operates an instantaneously closed, delayed opening set of valve solenoid contacts which control fluid to the hydraulic cylinder 134 so as to pivot and retain the flipper plates 22 upwardly for a short timed interval and then return same to their unpivoted position;

(b) Energizes, following the short timed interval of step 1 (a), the reversible motors 20 for the drive rolls 18 to drive them in a forward direction at their fast speed.

(2) The pipe member advances from the posiion M1 and drops onto the pipe roll line so as to begin immediately being conveyed to the right toward the dotted line position M3 as viewed in FIGURE 1. The trailing end uncovers and immediately closes a delayed opening set of contacts in a pipe-actuated limit switch LS42T (FIGURE 1) which is included in a circuit timed thereby. This circuit:

(a) Immediately reduces the forward speed of the motors 20 to slow, and after timed interval, (b) Stops the motors 20, and (c) Actuates the gripper 30 to clamp the pipe member which meantime has advanced into engagement with and been stopped by the pipe stop 28.

(3) As the jaws of the gripper 30 clamp the pipe, their movement trips a limit switch LS48 (FIGURE 1) which operates a relay in circuit with a belt conveyor drive motor 144 (FIGURE 5) for feeding a plug onto the plug saddle fixture stand 62.

(4) The oncoming plug in following the axis 13 of the path of the belt conveyor of FIGURE 1 strikes a limit switch LS43 in attempting to enter the saddle structure 108. The switch LS43 has contacts which are included in interrelated control circuits and comprising: valve solenoid contacts controlling fluid to the ease-down air cylinder 120; electrical motor contacts for deenergizing the relay of step 3 which controls running the belt conveyor drive motor 144; valve solenoid contacts controlling fluid to the auxiliary air cylinder 128; valve solenoid contacts controlling fluid to the pneumatic wrench motor 90; and valve solenoid contacts controlling fluid to the slide cylinder 80. These circuits, therefore:

(a) Return the ease-down arms 112 and 114 by means of the air cylinder 120 to their unpivoted positions shown by the dotted lines 112a and 114a in FIGURE 5;

(b) Stop the belt conveyor 66 so that no more plugs are fed into the main saddle structure 108;

(c) Operate the air cylinder 128 to raise the auxiliary saddle 124 into the solid line elevated position of FIGURE 6;

(d) Energize the pneumatic motor 90 of the air-operated wrench 32 so as to turn at slow speed; and (e) Operate the air cylinder 80 for advancing the slide 74, causing the rotating wrench 32 to advance and start consequent rotation and advancement of the plug in the position P2.

(5) The rotating advancing plug drags the elongated shank 54 thereof across the auxiliary saddle 124 actuating a limit switch LS46 disposed on the saddle structure 108 of FIGURE 1. The switch LS46 has contacts which are included in a circuit and comprising valve solenoid contacts which control fluid to the air cylinder 64 and other valve solenoid contacts in conjunction with the contacts initiating step 4(d) and for increasing the slow running speed of the pneumatic motor 90. This circuit, therefore:

(a) Returns the pipe stop 28 to its unpivoted position to clear the path for the plug;

(b) Runs the pneumatic motor 90 of the air-operated wrench 32 at a high speed for rapidly threading the plug into the pipe member.

(6) The pneumatic motor 90 begins stalling as the plug is threaded tight with the pipe member, energizing a flow switch LS44 which is in an air line leading to the pneumatic motor 90 (FIGURE 1). The flow switch LS44 has a set of valve solenoid contacts for reversing the slide cylinder 80 of FIGURE 3. The flow switch LS44 has another set of valve solenoid contacts for stopping the pneumatic motor 90 which operates the air-operated wrench 32. These contacts are included in appropriate circuits effective for:

(a) Retracting the slide carriage 78 carrying the air-operated wrench 32; and (b) Stopping the effectually stalled pneumatic motor 90.

(7) The returning slide carriage 78 strikes a limit switch LS45 located at a point on the fixed guides 76. The switch LS45 has valve solenoid contacts in circuit with the respective pipe stop cylinder 64, auxiliary saddle cylinder 128, ease-down cylinder 120, and the gripper cylinder 70 for operating same as follows:

(a) The pipe stop is pivoted to the solid line position 28 of FIGURES 1 and 5 for blocking the next pipe member;

(b) The auxiliary saddle 124 lowers from the elevated position of FIGURE 6 into the flush position of FIGURE 5;

(c) The ease-down arms are pivoted to the plug blocking position shown in the solid line showings 112 and 114 of FIGURE 5;

(d) The cylinder 70 of FIGURE 3 unclamps the gripper jaws 30 from the pipe member.

(8) In unclamping, the gripper jaws move, thus reactivating the limit switch LS48 of step 3 above. This switch has a set of contacts in circuit with the roll drive motors 20 such that, when reactivated, the switch LS48 causes these motors 20 to operate in reverse, thus moving the unclamped pipe member toward the prealignment stop 26 of FIGURE 1.

(9) The leading end of the pipe member strikes a limit switch LS42 (FIGURE 1) as the pipe member moves into engagement with the prealignment stop 26. The limit switch LS42 has contacts in circuit with the roll drive motors 20 for stopping the pipe roll line and thus the plugged pipe member comes to a stationary position prealigned relationship ready to be kicked out by the flipper plates 22 as soon as the kickout mechanism 24 is operated at the beginning of the next cycle. Following the operation of the cycle just discussed, the operation of the apparatus is thereafter automatically actuated due to the presence of the parallel-connected limit switch LS41 referred to in step 1 which as indicated is mounted adjacent the feed skids 10 in the path of each oncoming pipe member to be plugged.

The cycle is then repeated with the coming of a pipe member fresh from the coupling station, not shown.

The electrical circuits, including time delay circuits, which operate the cylinders and motors in response to actuation of the limit switches are well known in the art and, therefore, not illustarted.

It is appreciated that the pipe member in the position M1 of FIGURE 1 does not take a random position but has an accurately prealigned position, the same as the prealigned position accurately set by the prealignment stop 26 such that each station of the tester can be designed in particular relationship to the preceding station with no chance of the pipe members hanging over or creating mechanical interference with the structure provided at either end of the next station.

Variations within the spirit and scope of the invention described are equally comprehended by the foregoing description.

I claim:

1. A pipe plug screw-on station for pre-threaded pipe members each adapted to receive a plug member, said plug member including an enalrged body portion threaded peripherally and a shank attached thereto and extending axially and rearwardly therefrom, said shank having a smaller diameter then said body portion, said station comprising a line of pipe support structures, plug saddle structure aligned with the pipe support line adjacent one end thereof, first and second means respectively operative for conveying a pipe member to a point on said pipe support line and for conveying a plug member to a point on said plug saddle structure such that the pipe member and the plug member are in mutually confronting adjacency at said points, said plug saddle structure including an erectile auxiliary saddle engageable with said shank of the plug member for raising the latter in a relatively elevated position with respect to said plug saddle structure so as to be coaxially level with said enlarged body portion of said plug member, and with said confronting pipe member, power driven tool means engageable with said shank for imparting rotation to said plug member and for advancing same into threading engagement with an end of said pipe member to effect plugging thereof.

2. A pipe plug screw-on station for plugging pre-threaded pipe members with an individual plug member, said plug member being enlarged at one end for plugging the adjacent end of the pipe member, said station comprising a line of pipe support structures, plug saddle structure aligned with the pipe support structures adjacent one end thereof, first and second means operative respectively for conveying a pipe member to a point on said pipe support line and for conveying a plug member to a point on said plug saddle structure such that the pipe member and the plug member are in mutual adjacency to one another at said point, a plurality of ease-down arms positioned in the path of the plug member adjacent said plug saddle structure and pivotable to advance and to block said plug member as it enters onto the saddle from said second means, said arms engaging said plug in local areas of differing diameter on the latter and having means to return said arms to their unpivoted position enabling the plug member as it is unblocked to progressively settle in said plug saddle in confronting relation to the pipe member, and means for relatively rotatingly advancing said confronting members into tightly threaded engagement together.

3. A pipe plug screw-on station for pre-threaded pipe members, comprising the combination of a line pipe support structures, a plug saddle structure aligned with the pipe support line adjacent one end thereof, a pipe stop positioned intermediate said pipe support line and said saddle structure and pivotable from said position to stop a pipe member driven on said pipe support line, a pre-alignment stop fixed with respect to said pipe support line at the end opposite said pipe stop, pipe reciprocating means operatively connected to drive a pipe member on said pipe support line in a direction into engagement with said pipe stop in its pivoted position adjacent said saddle and in the opposite direction into engagement with said pre-alignment stop, plug screw-on means effective when said pipe member and said pipe stop are engaged for advancing a plug member from said saddle structure toward said pipe member, and means to restore said pipe stop to unpivoted position enabling said screw-on means to plug said pipe member with the plug member being advanced thereby.

4. A pipe plug screw-on station for pre-threaded pipe members, comprising the combination of a line pipe support structures, a plug saddle structure aligned with the pipe support line adjacent one end thereof, a pipe stop positioned intermediate said pipe support line and said saddle structure and pivotable from said position to stop a pipe member driven on said pipe support line, a pre-alignment stop fixed with respect to said pipe support line at the end opposite said pipe stop, pipe reciprocating means operatively connected to drive a pipe member on said pipe support line in a direction into engagement with said pipe stop in its pivoted position adjacent said saddle and in the opposite direction into engagement with said prealignment stop, plug screw-on means effective when said pipe member and said pipe stop are engaged, for advancing the plug member from said saddle structure toward said pipe member, means to return said pipe stop to unpivoted position enabling said screw-on means to plug said pipe member with the plug member being advanced thereby, and a gripper to clamp, said pipe member in fixed position while being plugged.

5. A pipe plug screw-on station for pre-threaded pipe members, comprising the combination of a line of pipe support structures, a plug saddle structure aligned with the pipe support line adjacent one end thereof, a pipe stop positioned intermediate said pipe support line and said saddle structure and pivotable from said position to stop a pipe member driven on said pipe support line, a prealignment stop fixed with respect to said pipe support line at the end opposite said pipe stop, pipe reciprocating means operatively connected to drive a pipe member on said pipe support line in a direction into stopped engagement with said pipe stop in its pivoted position adjacent said saddle and in the opposite direction into engagement with said prealignment stop, plug screw-on means effective after said pipe member has effected stopped engagement with said pipe stop, for advancing a plug member from said saddle structure toward said pipe member, means to return said pipe stop to unpivoted position enabling said screw-on means to plug said pipe member with the plug member being advanced thereby, and means to kick out said plugged pipe member when it reaches a prealigned position in the opposite direction on said pipe support line established by said prealignment stop.

6. A pipe plug screw-on station for plugging pre-threaded pipe members with individual plug members, each plug member having an enlarged end adapted to plug the pipe member, said station comprising the combination of a line of pipe support structures, plug saddle structure aligned with the pipe support line adjacent the one end thereof, first and second means respectively operative for conveying a pipe member to a point on said pipe support line and for conveying a plug member to a point on said plug saddle structure such that the pipe member and the plug member are mutually adjacent one another at said points, a plurality of ease-down arms positioned in the path of the plug member adjacent said plug saddle structure and pivotable to advance and to block said plug member as it enters onto the saddle structure from said second means, said arms being laterally and angularly displaced from one another and engageable with surface portions of differing diameters on said plug member whereby the plug member is orientated with the enlarged end thereof and the opposite thereof aligned in a vertical plane substantially parallel to the pipe support line, means to return said arms to their unpivoted position enabling the plug member as it is unblocked to progressively settle in said plug saddle structure in the orientation aforesaid, said plug saddle structure including an auxiliary saddle operative to engage the smaller end of the plug member for supporting the latter in a relatively elevated position of orientation with the enlarged end and the smaller end aligned in a substantially horizontal plane, and means for relatively rotatively advancing said members into tightly screwed relation together.

7. A pipe plug screw-on station for plugging pre-threaded pipe members with individual plug members, each plug member having an enlarged end adapted to plug the pipe member, said station comprising the combination of a line of pipe support structures, plug saddle structure aligned with the pipe support line adjacent the one end thereof, first and second means respectively operative for conveying a pipe member to a point on said pipe support line and for conveying a plug member to a point on said plug saddle structure such that the pipe member and the plug member are mutually adjacent one another at said points, a pipe stop positioned adjacent said two points and pivotal therefrom to stop said pipe member while being drivingly conveyed on said pipe support line, a plurality of ease-down arms positioned in the path of the plug member adjacent said plug saddle structure and pivotable to advance and to block said plug member as it enters onto the saddle structure from said second means, said arms being laterally and angularly displaced from one another and engageable with surface portions of said plug member of differing diameters whereby the plug member is orientated with the enlarged end thereof and the opposite thereof aligned in a vertical plane substantially parallel to the pipe support line, means to return said arms to their unpivoted position enabling the plug member as it is unblocked to progressively settle in said plug saddle structure in the orientation aforesaid, said plug saddle structure including an auxiliary saddle engageable with the smaller end of the plug member for supporting the latter in a relatively elevated position of orientation with the enlarged end, the smaller end aligned in a substantially horizontal plane, means to restore said pipe stop to the unpivoted position once it stops said pipe member, and means for relatively rotatively advancing said members into tightly screwed relation together.

8. A pipe plug screw-on station for plugging pre-threaded pipe members with individual plug members, each plug member having an enlarged end adapted to plug the pipe member, said station comprising the combination of a line of pipe support structures, plug saddle structure aligned with the pipe support line adjacent the one end thereof, first and second means respectively operative for conveying a pipe member to a point on said pipe support line and for conveying a plug member to a point on said plug saddle structure such that the pipe member and the plug member are mutually adjacent one another at said points, a plurality of ease-down arms positioned in the path of the plug member adjacent said plug saddle structure and pivotable into an advanced position to block said plug member as it enters onto the saddle structure from said second means, said arms being laterally and angularly displaced from one another and engageable with surface portions of said plug members of differing diameters whereby the plug member is orientated with the enlarged end thereof and the opposite thereof aligned in a vertical plane substantially parallel to the pipe support line, means to return said arms to their unpivoted position enabling the plug member as it is unblocked to progressively settle in said plug saddle structure in the orientation aforesaid, said plug saddle structure including an auxiliary saddle elevatable to engage the smaller end of the plug member for supporting the latter in a relatively elevated position of orientation with the enlarged end and the smaller end aligned in a substantially horizontal plane, means for relatively rotatively advancing said members into tightly screwed relation together, and automatic limit switches located on said saddle structure for operation in sequence whereof depending on the position of said plug member operation of one switch returns said ease-down arms whereby said plug settles with the ends aligned in said vertical plane, and elevates said auxiliary saddle whereby the ends of the plug align in the horizontal plane of orientation aforesaid, and operation of another switch senses the vacation of said auxiliary saddle by the trailing end of said plug.

9. For use in a pipe plug screw-on station, a two-way prealignment fixture for the plugs, each plug of which has an enlarged end adapted to plug the pipe, said fixture including plug saddle structure onto which the plugs enter the fixture for support therein, withdrawable ease-down means mounted on said fixture in the path of the entering plugs adjacent the plug saddle structure and having a fixed upper axis about which they are pivotable between their normal withdrawn position and a preliminarily advanced position to block each plug entering onto the plug saddle structure, said ease-down means engageable in predetermined way with portions of the plug whereby the plug is orientated with the enlarged end thereof and the opposite end thereof aligned in a vertical plane substantially parallel to the longitudinal axis of the plug saddle structure, enabling said plug member as it is unblocked due to withdrawing the ease-down means to progressively settle in said plug saddle structure in the orientation aforesaid, said plug saddle structure including an auxiliary saddle engageable with the smaller end of the plug for supporting the latter in a relatively elevated position of orientation with the enlarged end and the smaller end aligned in a substantially horizontal plane thus effecting two-way prealignment, the auxiliary saddle having operating means therefor connected for shifting said auxiliary saddle between a withdrawn position and a position supporting the smaller end of the plug in the elevated relation aforesaid.

10. In a pipe plug screw-on station, a two-way prealignment fixture for the plugs, each of which having an enlarged end adapted to plug the pipe, said fixture including plug saddle structure onto which the plugs enter the fixture for support therein, a plurality of ease-down arms positioned on said fixture in the path of the plugs adjacent the plug saddle structure and mounted to pivot on a fixed axis in the fixture into an advanced position to temporarily block each plug as it enters onto the saddle structure, said arms being laterally and angularly displaced from one another and engageable with surface portions of differing diameters on said plug whereby the plug is orientated one way with the enlarged end thereof and the opposite end thereof aligned in a vertical plane substantially parallel to the longitudinal axis of the plug saddle structure, and means to return said arms to their unpivoted position enabling the plug member as it is unblocked to progressively settle in said plug saddle structure in the orientation aforesaid, said plug saddle structure including an auxiliary saddle elevatable to engage the smaller end of the plug for supporting the latter in a relatively elevated position of orientation with the enlarged end and the smaller end in a second way aligned in a substantially horizontal plane, the auxiliary saddle having operating means therefor connected for shifting said auxiliary saddle between a withdrawn position and a position supporting the smaller end of the plug in the elevated relation aforesaid.

11. A pipe plug screw-on station for pre-threaded pipe members, each adapted to receive a plug member at an end thereof, said plug member including an enlarged body portion threaded peripherally and a shank attached thereto and extending axially and rearwardly therefrom, said shank having a smaller diameter than said body portion, said station comprising a line of pipe support structures, plug saddle structure aligned with the pipe support line adjacent one end thereof, first and second means respectively operative for conveying a pipe member to a point on said pipe support line and for conveying a plug member to a point on said plug saddle structure such that the pipe member and the plug member are in mutually confronting adjacency at said points, shank engageable means located adjacent said saddle and movable into engagement with said shank to bring same into an elevated position whereat said shank is coaxially level with said body portion of said plug member and with said confronting pipe member, and power driven tool means engageable with said shank for imparting rotation to said plug member and for davancing same into threading engagement with an end of said pipe member to effect plugging thereof.

References Cited in the file of this patent
UNITED STATES PATENTS

| | | |
|---|---|---|
| 470,575 | Jensen | Mar. 8, 1892 |
| 2,756,490 | Sawdey | July 31, 1956 |
| 2,941,284 | McConnell | June 21, 1960 |